UNITED STATES PATENT OFFICE.

MARSTON TAYLOR BOGERT, OF NEW YORK, N. Y.

AZO DYESTUFF.

1,012,055. Specification of Letters Patent. Patented Dec. 19, 1911.

No Drawing. Application filed January 5, 1910, Serial No. 536,481. Renewed January 3, 1911. Serial No. 600,525.

*To all whom it may concern:*

Be it known that I, MARSTON TAYLOR BOGERT, a citizen of the United States, and a resident of the city of New York, borough of Manhattan, in the county and State of New York, have invented certain new and useful Improvements in Azo Dyestuffs, of which the following is such a full, clear, and accurate description as will enable any one skilled in the art to which it appertains to make and use the same.

My invention relates to the manufacture and production of new azo dyestuffs by using quinazolin compounds as couplers to combine with various diazo or tetrazo salts.

In my application No. 487695, filed April 3, 1909, it is shown that compounds containing the nucleus

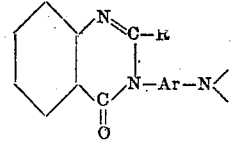

couple readily with diazo or tetrazo salts, thereby yielding new azo dyestuffs. In the above formula Ar represents a simple or substituted aromatic nucleus and R represents a simple or substituted alphyl or aryl radical. I have now found that this coupling is not dependent upon the presence of the —Ar.N group of the above formula, or even of the oxygen of the CO group, but that diazo or tetrazo salts will unite direct with a great variety of compounds containing the quinazolin nucleus or skeleton:

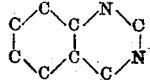

thereby producing new and useful azo dyestuffs, all of which contain the grouping Ar—N : N—Q in which Ar represents a simple or substituted aromatic nucleus, and Q the quinazolin compound used as the coupler, the azo group being attached to the benzole portion of the quinazolin nucleus.

When the tetrazo salt is used, disazo dyes may be produced of the

type, in which Ar is the nucleus of the tetrazotized base, Q is a quinazolin coupler, and X either a quinazolin coupler or some other coupler.

The coupling of the diazo or tetrazo salt with a quinazolin coupler is carried out according to the well-known methods employed in preparing azo dyestuffs, and these quinazolin couplers appear adapted to use in essentially the same manner as other couplers are now employed for the production of azo dyestuffs.

These new azo dyestuffs may be used as finished dyes, or the diazotizing and coupling may be carried out in the fiber itself. They may also be used as mordant dyes; or for the preparation of pigments by using insoluble azo combinations or suitable lakes. If the quinazolin coupler carries a diazotizable amino group, the aminoazo dye obtained may be again diazotized and coupled, thus giving a polyazo dyestuff. These new azo dyestuffs are substantive for silk and wool. Many of them are also direct cotton dyes.

The following example will further illustrate the nature of my invention and how it can be carried into practical effect, but my invention is not limited to this example. The parts are by weight.

Example: 206 parts of the sodium salt of benzoylene urea (also known as 2.4-dihydroxyquinazolin or 2.4-diketotetrahydroquinazolin) are dissolved in sufficient water to give a clear solution. One part of caustic soda is added, and 234 parts diazo naphthionic acid (made into a thin paste with water) is slowly stirred in. After stirring for three or four hours, the solution is evaporated to dryness. As thus prepared, the dyestuff is a dark red powder, dyeing wool in acid bath a bright crimson. In concentrated sulfuric acid, it dissolves to a deep blue solution which on dilution with water becomes a clear carmine, and on addition of metallic zinc becomes colorless. It is less soluble in concentrated hydrochloric acid, giving a reddish solution which changes to a pale yellow on the addition of stannous chlorid. In strong ammonia water, it dissolves to a reddish solution which changes to a pale yellow when boiled with zinc dust. It dissolves in glacial acetic acid to a bright red solution, and in alcohol (95%) to an orange-red one, but is practically insoluble in ether. Reduced with stannous chlorid and hydrochloric acid, an amino quinazolin is produced in which the amino group is attached to the benzole portion of the quinazolin nucleus. If this amino quinazolin be separated, diazotized and coupled with naphthionic acid, the dyestuff obtained is not identical with the original one.

In lieu of the naphthionic acid used in the above example, I have successfully employed many other aromatic amins and amino compounds. My experiments indicate that any of the amino compounds used for the production of diazo or tetrazo salts in preparing other azo dyestuffs can be used equally well with quinazolin couplers.

In lieu of the benzoylene urea mentioned above, I have successfully employed a great many other quinazolin compounds; as, for example, 4-quinazolone (4-hydroxyquinazolin), 2-methyl-4-quinazolone, 2-methyl-3-phenyl-4-quinazolone, 2.3-dimethyl-4-quinazolone, 2-phenyl-4-quinazolone, 2-benzyl-4-quinazolone, 2-methyl-6-brom-4-quinazolone, 2-methyl-7-nitro-4-quinazolone, 2.3-dimethyl-5-nitro-4-quinazolone, 5-amino-4-quinazolone, 2-isopropyl-4-thioquinazolone, 3-phenyldihydroquinazolin (orexin), thiobenzoylene urea, and others. My experiments would seem to show that any quinazolin compound can be used which still has a position free, on the benzole side of the nucleus, to which the diazo group can attach itself.

My experiments indicate that these new azo dyestuffs possess the following general properties: They are substantive dyes for silk and wool, many also dyeing cotton direct. They include both monazo and polyazo dyestuffs. In concentrated sulfuric acid, they dissolve to richly colored solutions, the color varying with the particular dyestuff used. Their solutions in concentrated hydrochloric acid are rapidly reduced and the color changed to a pale yellow by the addition of stannous chlorid, the azo groups being split between the nitrogens. One product of this splitting is an amino quinazolin in which the amino group is attached to the benzole side of the quinazolin nucleus; but, on reduction in this way, no one of these dyes gives both a 5-amino quinazolin and 1-amino-2-naphthol. Further, if the amino quinazolin obtained by this reduction be diazotized and coupled with the same component or components used in the preparation of the original dye, a dyestuff different from the original one is obtained.

I employ the expression "diazotized aromatic compound" generically to include either the diazo or tetrazo salt and I employ the expression "aromatic nucleus" generically to include either a simple or substituted aromatic nucleus and I desire to cover generically both the monazo and polyazo structures.

What I claim and wish to secure by Letters Patent is:—

1. The process of producing azo dyestuffs by coupling a diazotized aromatic compound with compounds containing the following quinazolin nucleus

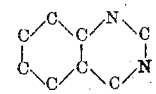

all of which dyestuffs contain the group Ar—N:N—Q in which Ar is an aromatic nucleus and Q is the quinazolin coupler used.

2. As an article of manufacture, an azo dyestuff which contains the group Ar—N:N—Q in which Ar is an aromatic nucleus and Q is the quinazolin coupler used, and which, when reduced with stannous chlorid and hydrochloric acid gives an amido quinazolin compound in which the amido group is attached to the benzole portion of said quinazolin nucleus.

In testimony whereof, I have hereunto signed my name in the presence of two subscribing witnesses.

MARSTON TAYLOR BOGERT.

Witnesses:
  ALFRED H. KROPFF,
  CARL G. AMEND.